United States Patent
Brück et al.

(10) Patent No.: US 8,211,326 B2
(45) Date of Patent: Jul. 3, 2012

(54) MAGNETIC MATERIAL WITH COOLING CAPACITY, A METHOD FOR THE MANUFACTURING THEREOF AND USE OF SUCH MATERIAL

(75) Inventors: Ekkehard Hubertus Brück, Amsterdam (NL); Ojiyed Tegusi, Amsterdam (NL); Frank Roelof De Boer, Amsterdam (NL)

(73) Assignees: Stichting voor de Technische Wetenschappen Utrecht, Utrecht (NL); Universiteit van Amsterdam, Faculteit der Natuuwetenschappen, Wiskunde en Informatica, Amsterdam, Amsterdam (NL)

( * ) Notice: Subject to any disclaimer, the term of this patent is extended or adjusted under 35 U.S.C. 154(b) by 730 days.

(21) Appl. No.: 10/543,673

(22) PCT Filed: Jan. 29, 2003

(86) PCT No.: PCT/NL03/00059
§ 371 (c)(1), (2), (4) Date: Jan. 11, 2006

(87) PCT Pub. No.: WO2004/068512
PCT Pub. Date: Aug. 12, 2004

(65) Prior Publication Data
US 2006/0117758 A1    Jun. 8, 2006

(51) Int. Cl.
| | |
|---|---|
| C04B 35/00 | (2006.01) |
| C09D 5/23 | (2006.01) |
| H01F 1/00 | (2006.01) |
| C09K 5/00 | (2006.01) |
| C09K 5/04 | (2006.01) |
| F25B 21/00 | (2006.01) |

(52) U.S. Cl. .................. 252/62.51 R; 252/67; 62/3.1
(58) Field of Classification Search .............. 62/3.1, 62/4, 6, 51.1; 148/306, 310–315; 252/67, 252/62.51

See application file for complete search history.

(56) References Cited

U.S. PATENT DOCUMENTS
7,069,729 B2 * 7/2006 Bruck et al. ............. 62/3.1

FOREIGN PATENT DOCUMENTS
NL    134917    4/1972

OTHER PUBLICATIONS

Ryzhkovskii. Ferromagnetic-Antiferromagnetic Phase Transition in Mn2Sb(Sn) Solid Solutions. Physica Status Solidi. vol. 130 Issue 1. 1992. pp. 163-168.*
Ryzhkovskii. Spin reorienatation transition in alloys of Mn2-xAxSb1-yBy(A=Cu, Zn. Ni, FeB=As, Sn) Physica Status Solidi. vol. 150 Issue 2. 1995. pp. K31-K33.*
Jernberg. A mossbauer study of Fe2P1-xSix (x<.35). Journal of Solid State Chemistry 53. 313-322. (1984).*
Severin. Magnetism and crystal structure in orthorhombic Fe2P: a theoretical and experimental study. Journal of Physics: Condensed Matter 7. p. 185-198. (1995).*
Beckman. Specific Heat of the Ferromagnet Fe2P. Physica Scripta vol. 25. p. 679-681. (1982).*
Fruchart. Crystalllographic and Magnetic Properties of Solid Solutions of the Phosphide M2P M=Cr, Mn, Fe, Co. Ni. Journal of Applied Physics. vol. 40, 3. 1250-1257.*
International Search Report dated Jun. 11, 2003 which issued during International Application No. PCT/NL02/00737.
Didukh et al., Journal of Magnetism and Magnetic Materils, vol. 2540255, Jan. 2003, pp. 407-409.
Conde, et al., Journal of magnetism and Magnetic Materials, vol. 138, No. 3, pp. 314-318.

* cited by examiner

Primary Examiner — Carol M Koslow
Assistant Examiner — Matthew Hoban
(74) Attorney, Agent, or Firm — Jeffrey D. Myers; Samantha A. Updegraff; Peacock Myers, P.C.

(57) ABSTRACT

The invention relates to a material that can be used for magnetic refrigeration, wherein the material substantially has the general formula $(A_YB_{1-Y})_{2+\delta}C_WD_XE_Z$ Wherein: A is selected from Mn and Co; B is selected from Fe and Cr; of C, D and E at least two are different, have a non-vanishing concentration and are selected from P, B, Se, Ge, Ga, Si, Sn and Sb; wherein at least one of C, D and E is Ge or Si; $W$, $X$, $Y$ and $Z$ each is a number in the range 0-1, and $W+X+Z=1$; and $\delta$ is a number from $(-0.1)-(+0.1)$.

20 Claims, 1 Drawing Sheet

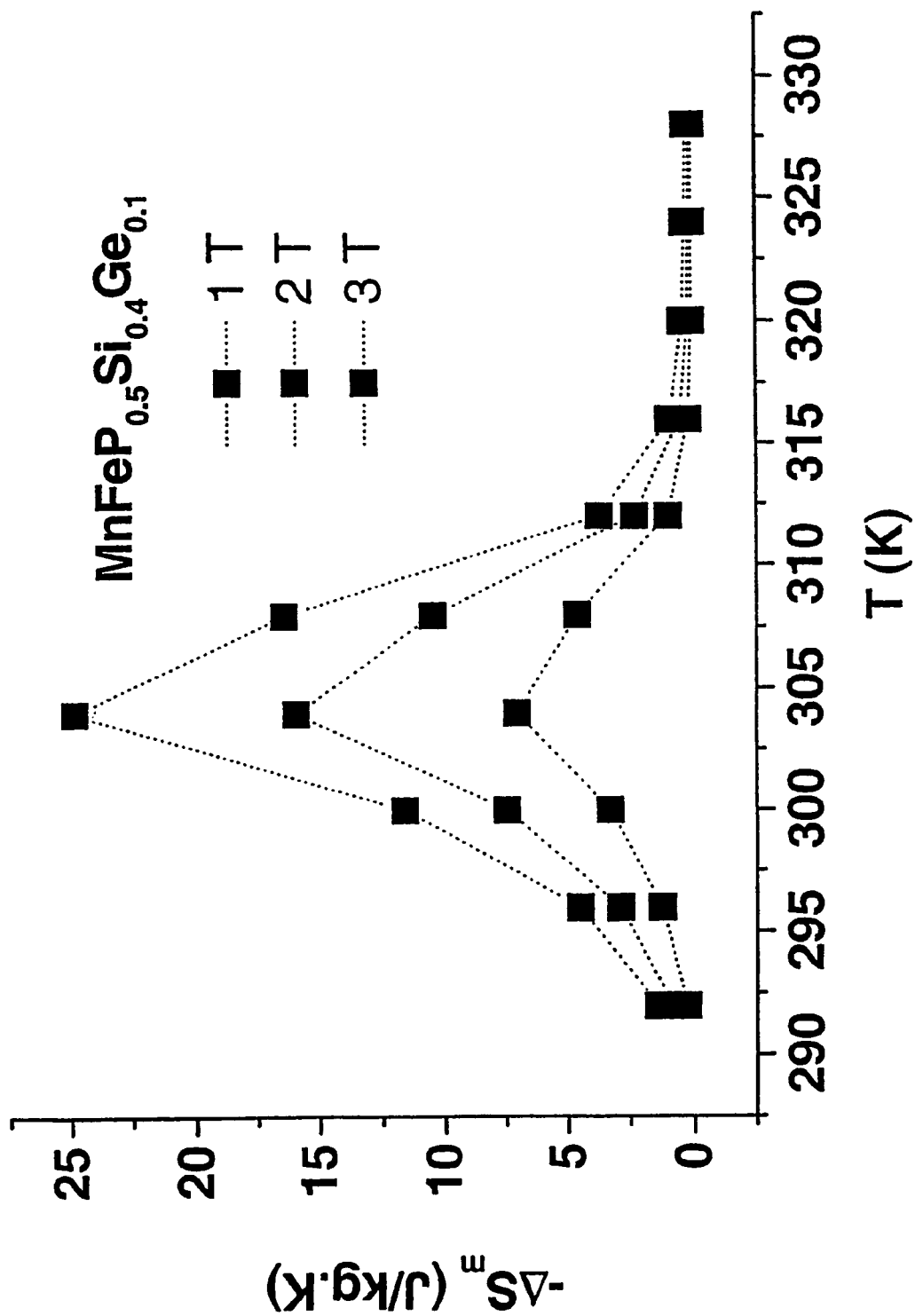

MAGNETIC MATERIAL WITH COOLING CAPACITY, A METHOD FOR THE MANUFACTURING THEREOF AND USE OF SUCH MATERIAL

A magnetic material with cooling capacity, a method for the manufacturing thereof and use of such material The invention relates to a material that can be used for magnetic refrigeration.

Such a material is known, for example, from the review "Recent Developments in Magnetic Refrigeration" by K.A. Gschneidner Jr. et al. in Materials Science Forum Vols. 315-317 (1999), pp. 69-76. This article reports that a search for new materials with improved magnetocaloric properties has led to the discovery of a strong magnetocaloric effect (MCE) in Gd metal and in $Gd_5(Si_xGe_{1-x})_4$ alloys, among which $Gd_5(Si_2Ge_2)$.

Such new materials make it possible to use magnetic refrigeration (MR) in refrigerated storage and refrigerated transportation of food, air conditioning in buildings and vehicles, etc.

A great advantage of magnetic refrigeration is that it is an environmentally safe technology that does not use ozone layer-depleting chemicals such as CFC's, hazardous chemicals such as $NH_3$, greenhouse gasses, etc. Moreover, because of the expected energy-efficiency, the amount of energy consumed and consequently the emission of $CO_2$ will be reduced.

A draw-back of the known materials that can be used for magnetic refrigeration is that they are not optimally applicable in the temperature range from approximately 200 to 600 K. Also, the known materials that are suitable for magnetic refrigeration such as the above-mentioned $Gd_5(Si_xGe_{1-x})_4$ alloys are very expensive, which hinders their use on a large scale.

There is a continuous need for new materials that are useful for magnetic refrigeration.

It is an object of the present invention to avoid the above-mentioned draw-back and to fill the aforementioned need.

According to the present invention, this goal is achieved with a material according to the preamble, wherein the material substantially has the general formula

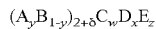

$$(A_yB_{1-y})_{2+\delta}C_wD_xE_z$$

wherein:

A is selected from Mn and Co;
B is selected from Fe and Cr;
of C, D and E at least two are different, have a non-vanishing concentration and are selected from P, B, Se, Ge, Ga, Si, Sn, N and Sb; wherein at least one of C, D and E is Ge or Si;
w, x, y and z each denotes a concentration and is a number in the range 0-1, and w+x+z=1; and
δ is a number from (−0.1)-(+0.1).

With such a composition it is possible to vary the working point from cryogenic temperatures to above room temperature. Furthermore, depending on the composition, with these alloys one can obtain a magnetocaloric effect that is stronger than that obtained with pure Gd. This is absolutely unexpected, because the magnetic moments of Gd-materials are by a factor of 2 greater than those of transition metal alloys, for which reason strong magnetocaloric effects are only expected in Gd-materials. The cooling capacity of the materials according to the present invention may therefore be higher than that of the best Gd-based materials referred to in the article by Gschneidner Jr. et al. (see above). Moreover, the maximum cooling capacity covers a much more useful range of temperature with regard to the application in, for example, an air conditioner.

A further advantage of the materials according to the present invention is that they are comprised of widely occurring elements, so that large-scale application is possible.

The magnetocaloric effect is so strong that it becomes possible to work with a magnetic field generated by permanent magnets instead of (optionally superconductive) electromagnets.

A further advantage is that the materials according to the present invention do not or not readily dissolve in water.

It is preferred that C, D and E are identical or different and are selected from at least one of P, Ge, Si, Sn and Ga.

Preferably in the material according to the present invention is that at least 90%, preferably at least 95% of A is Mn; at least 90%, preferably at least 95% of B is Fe; at least 90%, preferably at least 95% of C is P; at least 90%, preferably at least 95% of D is Ge; and at least 90%, preferably at least 95% of E is Si.

According to a further preferred embodiment, the material has the general formula $MnFe(P_wGe_xSi_z)$.

This material produces a high cooling capacity in the temperature range of 200-600 K, preferably 280-500 K. It has an exceptionally strong magnetocaloric effect.

If there is a possibility that the compound according to the invention comes into contact with the environment, the compound is also preferred, because no poisonous compounds can develop during decomposition.

Favourable results are also obtained when x is a number in the range from 0.3-0.7, w≦1−x and z=1−x−w.

It is especially preferred that the material according to the invention is in the hexagonal $Fe_2P$ structure.

The present invention also relates to a method for the manufacture of the material as indicated above, characterized by performing the steps of mixing powders of each of the elements A, B, C, D and E as indicated in claim 1, in suitable weight proportions to produce a powder mixture that complies with the general formula $(A_yB_{1-y})_{2+\delta}C_wD_xE_z$, if necessary grinding said mixture so as to obtain an amorphous or micro-crystalline powder mixture, sintering said obtained mixture under an inert atmosphere at a temperature of at least 700° C., preferably 700-1100° C., more preferably 800-1050° C., and annealing said sintered mixture at a temperature of from 600-700° C., preferably 630-680° C., more preferably 640-660° C.

A particularly preferable method starts out from pure elements in suitable weight proportions, these are mixed, the powder mixture is melted, and the resulting alloy is finally annealed. The starting materials may, for example, be treated in a ball mill to produce an alloy. This alloy is subsequently sintered under an inert atmosphere and then annealed, for example, in a suitable furnace. Especially an alloy of the composition $MnFeP_wGe_xSi_z$, preferably $MnFeP_{0.45-0.70}Ge_{0.55-0.30}$ and more preferably having the formula $MnFeP_{0.5-0.70}(Si/Ge)_{0.5-0.30}$ will exhibit a magnetocaloric effect at room temperature that is stronger than the one found when using pure Gd. This is contrary to the general expectation because based on the usual models, strong magnetocaloric effects are only expected in rare earth materials, as the magnetic moments in these materials are by a factor 2 or even more greater than in transition metal alloys. However, those models apply only at low temperatures. At room temperature a stronger magnetocaloric effect may occur in suitable alloys based on transition metals according to the invention.

It has been shown that if the above-mentioned materials are prepared starting out from the pure materials Ge or Si, P, Fe and Mn, wherein part of Ge, or all of Ge, is replaced by Sn or Ga, the resulting materials do indeed also exhibit a strong magnetocaloric effect.

Prior to melting, the powder mixture is preferably first compressed into a pill or any other desired shape. This reduces the chance of material loss when the material is being melted (sintered).

When melting the powder mixture under an inert atmosphere, it has been shown to be advantageous for this inert atmosphere to be an argon atmosphere. This reduces the occurrence of contaminants in the material during melting.

It is also preferable for the molten powder mixture to be annealed at a temperature in the 750-900° C. range, e.g. 780° C. This results in a low concentration gradient in the material.

Finally, the present invention relates to the application of the material according to the invention with magnetic refrigeration in the 200-600 K range. The material according to the present invention may be used, among other things, for food refrigerators, air conditioners, computers, etc.

The method according to the present invention will now be further elucidated with reference to a non-limiting exemplary embodiment.

EXAMPLE 1

An alloy of 5 g $FeMnP_{0.7}Ge_{0.3}$, with a critical temperature of about 350 K is obtained by mixing the pure elements, having a quality of 3N, in the following amounts: Fe=1.81 g, Mn=1.78 g, P=0.703 g and Ge=0.706 g. In a closed ball mill, these elements are ground under a protective atmosphere until an amorphous or micro-crystalline product is obtained. Dependent on the properties of the mill, such a product may be obtained within 20 minutes until a few hours.

The powder is subsequently heated in a closed ampoule in a protected atmosphere until a temperature is obtained of from 800 to 1050° C. Subsequently the same is annealed at a temperature of about 650° C.

EXAMPLE 2

An alloy of 5 g $FeMnP_{0.5}Ge_{0.5}$, having a critical temperature of about 600 K is obtained by mixing the pure elements, having a quality of 3N, in the following amounts: Fe=1.72 g, Mn=1.69 g, P=0.476 g and Ge=1.12 g. In a closed ball mill, these elements are ground under a protective atmosphere until an amorphous or micro-crystalline product is obtained. Dependent on the properties of the mill, such a product may be obtained within 20 minutes until a few hours.

The powder is subsequently heated in a closed ampoule in a protected atmosphere until a temperature is obtained of from 800 to 1050° C. Subsequently the same is annealed at a temperature of about 650° C.

EXAMPLE 3

An alloy of 5 g $FeMnP_{0.5}Ge_{0.1}Si_{0.4}$ having a critical temperature of about 300 K is obtained by mixing the pure elements, having a quality of 3N, in the following amounts: Fe=1.93 g, Mn=1.90 g, P=0.535, Ge=0.251 g and Si=0.388 g. In a closed ball mill, these elements are ground under a protective atmosphere until an amorphous or micro-crystalline product is obtained. Dependent on the properties of the mill, such a product may be obtained within 20 minutes until a few hours.

The powder is subsequently heated in a closed ampoule in a protected atmosphere until a temperature is obtained of from 800 to 1050° C. Subsequently the same is annealed at a temperature of about 650° C.

The alloys obtained by the fore-mentioned examples 1, 2 and 3 all crystallise in a hexagonal $Fe_2P$ structure. The alloy of Example 3 has a high magnetocaloric effect at and near the critical temperature, as shown in the appended FIG. 1.

A partial replacement of Ge by Sn or Ga is also possible, wherein alloys are obtained having a magnetocaloric effect as indicated in the examples 1, 2 and 3.

EXAMPLE 4

An alternative embodiment of the invention is obtained by starting out from alloys of the starting elements, instead of the pure elements; such is especially functional if Si is used in the alloy. Although the reason for this is not sure, it probably is due to the fact that FeSi alloys are very stable and are obtained if pure Fe and Si are available in the mill.

An alloy of 10 g $Fe_{0.86}Mn_{1.14}P_{0.5}Si_{0.35}Ge_{0.15}$ having a critical temperature of 390 K is obtained, by mixing the pure elements having a quality of 3N and the alloy $Fe_2P$ having a quality of 2N (Alpha Aesar 22951), in the following amounts: $Fe_2P$=4.18 g, Mn=4.26 g, P=0.148 g, Si=0.669 g and Ge=0.742 g. In a closed ball mill these elements are ground under a protective atmosphere until an amorphous or micro-crystalline product is obtained. Dependent on the properties of the mill, such a product is obtained within 20 minutes until a few hours.

The powder is subsequently heated (sintered) in a closed ampoule in a protected atmosphere until a temperature is obtained of from 800 to 1050° C. Subsequently the same is annealed at a temperature of about 650° C.

The present invention is not limited to the embodiment shown in the figures and described in the exemplary embodiment. The amounts may be varied in numerous ways within the scope of protection established by the claims.

The invention claimed is:

1. A material that can be used for magnetic refrigeration, substantially having the general formula $$(A_yB_{1-y})_{2+\delta}C_wD_xE_z$$

wherein:
A is selected from Mn and Co;
B is selected from Fe and Cr;
C, D and E are selected from P, B, Se, Ge, Ga, Si, Sn, N and Sb;
w, x, y and z each denotes a concentration and is a number in the range greater than 0 to 1, and w+x+z=1;
δ is a number from (−0.1)-(+0.1); and
at least 90% of A is Mn; at least 90% of B is Fe; at least 90% of C is P; at least 90% of D is Ge; and at least 90% of E is Si.

2. The material according to claim 1, wherein C, D and E are different and are selected from at least one of P, Ge, Si, Sn and Ga.

3. The material according to claim 1, wherein at least 95% of A is Mn; at least 95% of B is Fe; at least 95% of C is P; at least 95% of D is Ge; and at least 95% of E is Si.

4. The material according to claim 1, having the general formula $MnFe(P_wGe_xSi_z)$.

5. The material according to claim 1, wherein x is a number in the range of from 0.3-0.7, w≤1−x and z=1−x−w.

6. The material according to claim 1, wherein the material is in the crystalline hexagonal $Fe_2P$ structure.

7. A method for the manufacture of the material according to claim 1, wherein the steps of mixing powders of each of the elements A, B, C, D and E as indicated in claim 1, are in suitable weight proportions to produce a powder mixture that complies with the general formula $(A_yB_{1-y})_{2+\delta}C_wD_xE_z$, if necessary grinding said mixture so as to obtain an amorphous or micro-crystalline powder mixture, sintering said obtained mixture under an inert atmosphere at a temperature of at least 700° C. and annealing said sintered mixture at a temperature of from 600-700° C.

8. The method according to claim 7, wherein the sintering step substantially takes at least one hour and the annealing step takes substantially at least 24 hours.

9. The method according to claim 7, wherein prior to the sintering step, the powder mixture is compressed to a desired shape.

10. The method according to claim 7, wherein the inert atmosphere is an argon atmosphere.

11. The material according to claim 3, wherein the material is in the crystalline hexagonal $Fe_2P$ structure.

12. The method according to claim 7, wherein the obtained mixture is sintered under an inert atmosphere at a temperature from 800-1050° C. and said sintered mixture is annealed at a temperature of from 640-660° C.

13. A material that can be used for magnetic refrigeration, substantially having the general formula $$(A_yB_{1-y})_{2+\delta}C_wD_xE_z$$

wherein:
A is selected from Mn and Co;
B is selected from Fe and Cr;
C, D and E are selected from P, B, Se, Ge, Ga, Si, Sn, N and Sb;
w, x, y and z each denotes a concentration and is a number in the range greater than 0 to 1, and
w+x+z=1; and
$\delta$ is a number from (−0.1)-(+0.1); and
wherein the material is in a hexagonal $Fe_2P$ structure; and
wherein at least 90% of A is Mn; at least 90% of B is Fe; at least 90% of C is P; at least 90% of D is Ge; and at least 90% of E is Si.

14. The material according to claim 13, wherein at least 95% of A is Mn; at least 95% of B is Fe; at least 95% of C is P; at least 95% of D is Ge; and at least 95% of E is Si.

15. The material according to claim 13, having the general formula $MnFe(P_wGe_xSi_z)$.

16. The material according to claim 13, wherein x is a number in the range of from 0.3-0.7, w≦1−x and z=1−x−w.

17. The method according to claim 7, wherein the formula is $MnFeP_{0.5-0.70}(Si/Ge)_{0.5-0.30}$.

18. The method according to claim 8, wherein the formula is $MnFeP_{0.5-0.70}(Si/Ge)_{0.5-0.30}$.

19. The method according to claim 9, wherein the formula is $MnFeP_{0.5-0.70}(Si/Ge)_{0.5-0.30}$.

20. A material that can be used for magnetic refrigeration, substantially having the general formula $$MnFe(P_wGe_xSi_z)$$

wherein w, x, and z each denotes a concentration and is a number in the range greater than 0 to 1;
w+x+z=1; and
wherein the material is in a hexagonal $Fe_2P$ structure.

* * * * *

UNITED STATES PATENT AND TRADEMARK OFFICE
CERTIFICATE OF CORRECTION

PATENT NO. : 8,211,326 B2
APPLICATION NO. : 10/543673
DATED : July 3, 2012
INVENTOR(S) : Bruck et al.

It is certified that error appears in the above-identified patent and that said Letters Patent is hereby corrected as shown below:

As shown on title page 1, item (73)

Assignees: Stichting voor de Technische Wetenschappen Utrecht

Universiteit van Amsterdam, Faculteit der Natuuwetenschappen,
        Wiskunde en Informatica, Amsterdam Correction:

Assignees: Stichting voor de Technische Wetenschappen

Universiteit van Amsterdam, Faculteit der Natuurwetenschappen,
        Wiskunde en Informatica Signed and Sealed this
Twelfth Day of July, 2016

Michelle K. Lee
*Director of the United States Patent and Trademark Office*